(12) United States Patent
Liu et al.

(10) Patent No.: US 12,192,569 B2
(45) Date of Patent: Jan. 7, 2025

(54) AUDIO INFORMATION TRANSMISSION SYSTEM, METHOD, DEVICE, CORRESPONDING TWO WHEELED VEHICLE, AND HELMET

(71) Applicant: SHARKGULF TECHNOLOGY (QINGDAO) CO., LTD., Qingdao (CN)

(72) Inventors: Ke Liu, Shanghai (CN); Hui Hu, Shanghai (CN)

(73) Assignee: SHARKGULF TECHNOLOGY (QINGDAO) CO., LTD., Qingdao (CN)

( * ) Notice: Subject to any disclaimer, the term of this patent is extended or adjusted under 35 U.S.C. 154(b) by 181 days.

(21) Appl. No.: 17/793,772

(22) PCT Filed: Jan. 10, 2021

(86) PCT No.: PCT/CN2021/071003
§ 371 (c)(1),
(2) Date: Jul. 19, 2022

(87) PCT Pub. No.: WO2021/143631
PCT Pub. Date: Jul. 22, 2021

(65) Prior Publication Data
US 2023/0058270 A1    Feb. 23, 2023

(30) Foreign Application Priority Data

Jan. 19, 2020   (CN) .......................... 202010057148.4

(51) Int. Cl.
*H04N 21/439* (2011.01)
*B60W 20/10* (2016.01)
*H04N 21/2387* (2011.01)

(52) U.S. Cl.
CPC .......... *H04N 21/439* (2013.01); *B60W 20/10* (2013.01); *H04N 21/2387* (2013.01); *B60W 2300/36* (2013.01); *B60W 2540/30* (2013.01)

(58) Field of Classification Search
None
See application file for complete search history.

(56) References Cited

U.S. PATENT DOCUMENTS

| 7,233,815 | B2* | 6/2007 | Tabata | H04B 1/385 |
|---|---|---|---|---|
| | | | | 455/90.3 |
| 2006/0029235 | A1* | 2/2006 | Lazzeroni | H04B 1/207 |
| | | | | 381/86 |
| 2016/0352845 | A1* | 12/2016 | Nieh | G06Q 10/02 |

FOREIGN PATENT DOCUMENTS

| CN | 103617803 A | 3/2014 |
|---|---|---|
| CN | 104023305 A | 9/2014 |

(Continued)

OTHER PUBLICATIONS

International Search Report (with English Translation) and Written Opinion (with Machine Translation) issued on Apr. 1, 2021 in corresponding International Patent Application No. PCT/CN2021/071003; 15 pages.

*Primary Examiner* — Hemant S Patel
(74) *Attorney, Agent, or Firm* — Maier & Maier, PLLC

(57) ABSTRACT

Disclosed are an audio information transmission system, method, and apparatus, and a corresponding two-wheeled vehicle and helmet. The system includes a media control apparatus and an audio switching apparatus connected to the media control apparatus. The audio switching apparatus is connected to a mobile terminal and the helmet and is configured to receive first audio information transmitted by the mobile terminal and transmit same to the media control apparatus. The media control apparatus is configured to receive and mix second audio information generated by the (Continued)

two-wheeled vehicle with the first audio information, to generate mixed audio information. The audio switching apparatus transmits the mixed audio information to the helmet. In the present application, the audio information transmitted by the mobile terminal and information such as navigation voices, alarms emitted by the two-wheeled vehicle are mixed. The mixed audio information is transmitted to the helmet, so that the user can obtain both the audio information transmitted by the user terminal and the navigation voices transmitted by the electric vehicle, without switching between the audio information from the mobile terminal and the navigation voices emitted by the electric vehicle. The user's driving safety is improved and the user experience is enhanced.

9 Claims, 6 Drawing Sheets

(56) References Cited

FOREIGN PATENT DOCUMENTS

| | | | |
|---|---|---|---|
| CN | 106790938 | A | 5/2017 |
| CN | 108268233 | A | 7/2018 |
| CN | 111312262 | A | 6/2020 |
| JP | 2002261887 | A | 9/2002 |

* cited by examiner

AUDIO INFORMATION TRANSMISSION SYSTEM, METHOD, DEVICE, CORRESPONDING TWO WHEELED VEHICLE, AND HELMET

The present application claims priority to Chinese Patent Application No. 202010057148.4, filed on Jan. 19, 2020 and entitled "AUDIO INFORMATION TRANSMISSION SYSTEM, METHOD, AND APPARATUS, AND CORRESPONDING TWO-WHEELED VEHICLE AND HELMET", which is hereby incorporated for reference in its entirety.

TECHNICAL FIELD

The present application relates to the field of audio information exchange, and in particular to an audio information transmission system, method, and apparatus, and a corresponding two-wheeled vehicle and helmet.

BACKGROUND

With the development of technology, electric vehicles are used among an increasing number of people and gradually become a better means of transportation, However, safety becomes an important issue due to the fast speed of such a means of transportation, and people thus wear helmets for protection when driving.

An existing electric vehicle typically comes with a navigation system, and a helmet has a corresponding Bluetooth headset to receive audio information. However, the Bluetooth headset in the helmet cannot receive and play audio information (such as music and answering telephone calls, etc.) played by a terminal device and navigation voice of the electric vehicle simultaneously. Even if the audio information and the navigation voice are forced to be played simultaneously, the interference with each other will be caused, which affects the user experience.

SUMMARY

In order to solve the technical problem of how to play by the headset in the helmet both the audio information transmitted by the user terminal and the navigation voice transmitted by the electric vehicle, etc., without interference with each other, the present application provides an audio information transmission system, method, and apparatus, and a corresponding two-wheeled vehicle and helmet.

A first aspect of the present application provides an audio information transmission system, for transmitting audio information among a two-wheeled vehicle, a mobile terminal and a helmet, where the system includes a media control apparatus and an audio switching apparatus both provided in the two-wheeled vehicle, the audio switching apparatus being connected to the media control apparatus, where the audio switching apparatus establishes a data connection to each of the mobile terminal and the helmet, to receive first audio information transmitted by the mobile terminal and forward the first audio information to the media control apparatus;

the media control apparatus is configured to receive the first audio information and second audio information generated by the two-wheeled vehicle, and mix the first audio information with the second audio information to generate mixed audio information; and the audio switching apparatus is further configured to transmit the mixed audio information to the helmet.

In one embodiment of the present application, the audio switching apparatus includes a first communication module for receiving the first audio information transmitted by the mobile terminal and forwarding the first audio information to the media control apparatus; and the media control apparatus includes a media control module and an audio mixing module, where the media control module is configured to forward the first audio information to the audio mixing module and transmit control instructions to the audio mixing module; and the audio mixing module is configured to receive the control instructions and mix the first audio information with the second audio information to generate the mixed audio information.

In one embodiment of the present application, the media control module is further configured to obtain priority information of the first audio information and the second audio information, or set different priorities for the first audio information and the second audio information depending on types of the audio information; and control the audio mixing module to mix the first audio information with the second audio information according to the priority information to generate the mixed audio information.

In one embodiment of the present application, the audio switching apparatus is further configured to receive instructions from the mobile terminal and set different priorities for the first audio information and the second audio information depending on types of the audio information, and transmit the priority information to the media control apparatus.

In one embodiment of the present application, the audio mixing module reduces or mutes volume of audio information of a lower priority when mixing audio information of different priorities.

In one embodiment of the present application, the audio mixing module pauses audio information of a lower priority when mixing audio information of different priorities.

In one embodiment of the present application, the audio switching apparatus further includes an audio identification module for identifying a type of the first audio information received, where the audio switching apparatus forwards the first audio information to the helmet when the first audio information is a call voice, and forwards the first audio information to the media control apparatus when the first audio information is a non-call voice.

In one embodiment of the present application, the system further includes:

a second communication module and a mixed audio playback module provided in the helmet, where the second communication module is configured to receive the mixed audio information, and the mixed audio playback module is configured to play the mixed audio information.

In one embodiment of the present application, the system further includes:

a cloud server and a third communication module connected to the media control apparatus, where the cloud server exchanges information with the media control apparatus via the third communication module.

In one embodiment of the present application, the media control apparatus receives configuration instructions transmitted by the cloud server, where the configuration instructions are used for generating priority rules and/or audio mixing parameters of the mixed audio information.

In one embodiment of the present application, the system further includes:

a display module provided in the two-wheeled vehicle and connected to the media control apparatus, where the media control apparatus is configured to transmit audio mixing status information to the display module for a visual display.

A second aspect of the present application provides an audio information transmission method, for transmitting audio information among a two-wheeled vehicle, a mobile terminal and a helmet, where the method includes:

generating, by the two-wheeled vehicle, second audio information and receiving first audio information transmitted by the mobile terminal;

mixing, by the two-wheeled vehicle, the first audio information with the second audio information to generate mixed audio information; and transmitting, by the two-wheeled vehicle, the mixed audio information to the helmet for playback.

In one embodiment of the present application, the operation of mixing, by the two-wheeled vehicle, the first audio information with the second audio information to generate mixed audio information further includes:

obtaining, by the two-wheeled vehicle, priority information of the first audio information and the second audio information, or setting different priorities for the first audio information and the second audio information depending on types of the audio information; and controlling the audio mixing module to mix the first audio information with the second audio information according to the priority information to generate the mixed audio information.

In one embodiment of the present application, the operation of mixing, by the two-wheeled vehicle, the first audio information with the second audio information to generate mixed audio information further includes:

receiving, by the two-wheeled vehicle, instructions from the mobile terminal to set different priorities for the first audio information and the second audio information depending on types of the audio information, and mixing the first audio information with the second audio information according to the priority information to generate the mixed audio information.

In one embodiment of the present application, volume of audio information of a lower priority is reduced or muted when the audio information of different priorities is mixed.

In one embodiment of the present application, audio information of a lower priority is paused when the audio information of different priorities is mixed.

In one embodiment of the present application, after the operation of generating, by the two-wheeled vehicle, second audio information and receiving first audio information transmitted by the mobile terminal, the method further includes:

identifying a type of the first audio information received, where the audio switching apparatus forwards the first audio information to the helmet when the first audio information is a call voice, and forwards the first audio information to the media control apparatus when the first audio information is a non-call voice.

In one embodiment of the present application, the method further includes:

receiving configuration instructions transmitted by a cloud server, where the configuration instructions are used for generating priority rules and/or audio mixing parameters of the mixed audio information.

A third aspect of the present application provides an audio information transmission apparatus, for transmitting audio information among a two-wheeled vehicle, a mobile terminal and a helmet, where the apparatus includes:

an audio receiving module configured to receive second audio information generated by the two-wheeled vehicle and first audio information transmitted by the mobile terminal;

an audio mixing module configured to mix the first audio information with the second audio information to generate mixed audio information;

an audio transmission module configured to transmit the mixed audio information to the helmet; and a control module configured to control the helmet to play the mixed audio information.

In one embodiment of the present application, the audio mixing module further includes:

a priority setting unit configured to set different priorities for the first audio information and the second audio information; and an audio mixing unit configured to mix the first audio information with the second audio information according to priorities from high to low to generate the mixed audio information.

In one embodiment of the present application, the apparatus further includes: an identification module for identifying a type of the first audio information received, where the audio transmission device forwards the first audio information to the helmet when the first audio information is a call voice, and forwards the first audio information to the media control apparatus when the first audio information is a non-call voice.

A fourth aspect of the present application provides a two-wheeled vehicle, including a vehicle body and a media control apparatus both provided in the vehicle body, where the two-wheeled vehicle further includes an audio switching apparatus connected to the media control apparatus, where the audio switching apparatus establishes a data connection to each of a mobile terminal and a helmet, for receiving the first audio information transmitted by the mobile terminal and forwarding the first audio information to the media control apparatus;

the media control apparatus is configured to receive the first audio information and second audio information generated by the two-wheeled vehicle, and mix the first audio information with the second audio information to generate mixed audio information; and the audio switching apparatus is further configured to transmit the mixed audio information to the helmet.

In one embodiment of the present application, the audio switching apparatus includes a first communication module for receiving the first audio information transmitted by the mobile terminal and forwarding the first audio information to the media control apparatus;

the media control apparatus includes a media control module and an audio mixing module, where the media control module is configured to forward the first audio information to the audio mixing module and transmit control instructions to the audio mixing module; and the audio mixing module is configured to receive the control instructions and mix the first audio information with the second audio information to generate the mixed audio information.

In one embodiment of the present application, the media control module is further configured to obtain priority information of the first audio information and the second audio information, or set different priorities for the first audio information and the second audio information depending on types of the audio information; and control the audio mixing module to mix the first audio information with the second audio information according to the priority information to generate the mixed audio information.

In one embodiment of the present application, the audio switching apparatus is further configured to receive instructions from the mobile terminal and set different priorities for the first audio information and the second audio information depending on types of the audio information, and transmit the priority information to the media control apparatus.

In one embodiment of the present application, the audio mixing module reduces or mutes volume of audio information of a lower priority when mixing audio information of different priorities.

In one embodiment of the present application, the audio mixing module pauses audio information of a lower priority when mixing audio information of different priorities.

In one embodiment of the present application, the audio switching apparatus further includes an audio identification module for identifying a type of the first audio information received, where the audio switching apparatus forwards the first audio information to the helmet when the first audio information is a call voice, and forwards the first audio information to the media control apparatus when the first audio information is a non-call voice.

In one embodiment of the present application, the media control apparatus receives configuration instructions transmitted by a cloud server, where the configuration instructions are used for generating priority rules and/or audio mixing parameters of the mixed audio information.

A fifth aspect of the present application provides a helmet, including a shell and a second communication module provided inside the shell, where the helmet further includes: a mixed audio playback module, where the second communication module is connected to a two-wheeled vehicle for receiving mixed audio information transmitted by the two-wheeled vehicle and forwarding the mixed audio information to the mixed audio playback module;

the mixed audio information is generated by the two-wheeled vehicle mixing first audio information transmitted by the mobile terminal with second audio information generated by the two-wheeled vehicle; and the mixed audio playback module is configured to play the mixed audio information.

A sixth aspect of the present application provides a computer-readable storage medium, storing one or more programs, where the one or more programs, when executed by a processor, implement the method as described above.

The technical solution of the present application has the following beneficial effects.

In the present application, the audio information transmitted by the mobile terminal is transmitted to the two-wheeled vehicle. The two-wheeled vehicle mixes the voice information such as navigation voices, alarms, etc. emitted by itself with the audio information transmitted by the mobile terminal, and can also configure volume level of each piece of voice information in the mixing audio information, and transmit the mixed audio information to the helmet, so that the user can obtain both the audio information transmitted by the user terminal and navigation voices transmitted by the electric vehicle, without switching between the audio information from the mobile terminal and the navigation voices emitted by the electric vehicle. The user's driving safety is improved and the user experience is enhanced.

BRIEF DESCRIPTION OF THE DRAWINGS

In order to make the technical problem solved, the technical means used and the technical effect achieved by the present application clearer, specific embodiments of the present application will be described in detail below with reference to the drawings. However, it should be declared that the drawings described below are only for example embodiments of the present application, and other embodiments of the drawings can be obtained by those skilled in the art according to these drawings without creative labor.

DETAILED DESCRIPTION OF THE EMBODIMENTS

Figure 1:
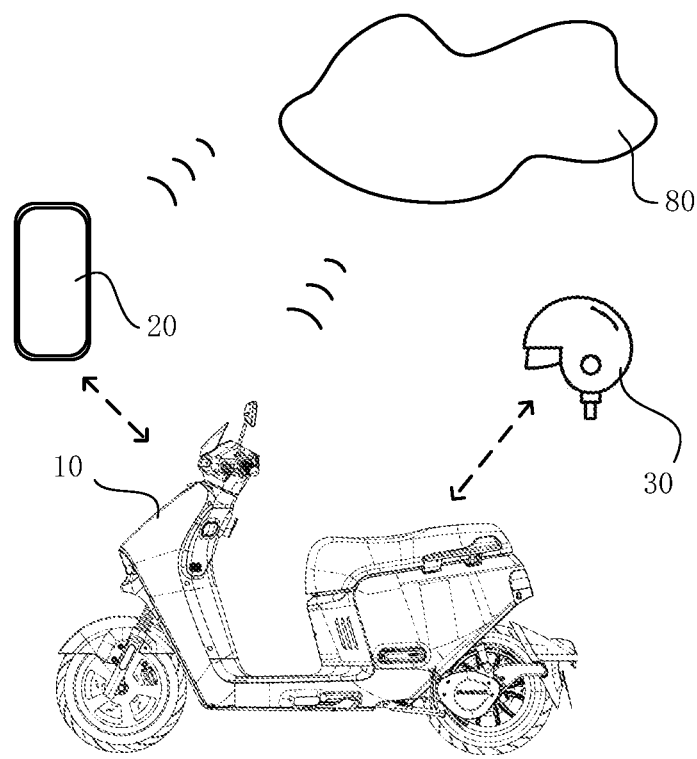
FIG. 1 is a schematic diagram of an application scenario of an audio information transmission system according to an embodiment of the present application.

In the description of specific embodiments, the details of the structure, performance, effect or other features are described for those skilled in the art to fully understand the embodiments. However, it is not excluded that those skilled in the art may implement the present application in a particular case with a technical solution that does not contain the structure, performance, effect, or other features described above.

The flowchart in the drawings is only an example process demonstration and does not mean that all of the contents, operations and steps in the flowchart must be included in the embodiment of the present application, nor that they must be performed in order shown in the drawings. For example, some operations/steps in the flowchart may be split, some operations/steps may be combined or partially combined, and so on, and the order of execution shown in the flowchart may be changed to suit the actual situation without departing from the inventive essence of the present application.

The block diagram in the drawings generally represents a functional entity and does not necessarily correspond to a physically separate entity. That is, the functional entity may be implemented by software, or in one or more hardware modules or integrated circuits, or in different network and/or processing unit apparatuses and/or microcontroller apparatuses.

The same reference numeral in the drawings denotes the same or similar elements, components, or parts, and thus repetitive descriptions of the same or similar elements, components, or parts may be omitted below. It should also be understood that while the attribute such as first, second, third, etc. representing number may be used herein to describe various devices, elements, components, or parts, these devices, elements, components, or parts should not be limited by such attributes. That is, these attributes are only used to distinguish one from another. For example, a first device may also be referred to as a second device, without departing from the substantial technical solution of the present application. In addition, the terms "and/or" refer to all combinations including any one or more of the listed items.

The present application provides an audio information transmission system, method, and apparatus, and a two-wheeled vehicle and a helmet. In general, the system includes a two-wheeled vehicle, a mobile terminal and a helmet worn by a user, among which information can be exchanged. The two-wheeled vehicle can be any two-wheeled vehicles, including a bicycle, an electric bicycle, a motorcycle, an electric motorcycle, an electric scooter, etc. The mobile terminal can be a mobile phone, a pad, a smart watch, etc.

In order to solve the problem that in the prior art, the user wearing the helmet cannot obtain both the audio information transmitted by the mobile terminal and the audio information transmitted by the two-wheeled vehicle itself, the two-wheeled vehicle of the present application adopts an audio information transmission system. The mobile terminal transmits the audio information to the two-wheeled vehicle. The two-wheeled vehicle mixes voice information such as navigation voices and alarms transmitted by itself and driving information transmitted by the cloud server with the audio information transmitted by the mobile terminal to generate mixed audio information, and then transmits the mixed audio information to the helmet for playback. The mixed audio information is different depending on the degree of importance of each type of audio information. The user can obtain, via the headset from the mixed audio information, both the audio information transmitted by the user terminal and the navigation information, etc. emitted by the electric vehicle, without operating the user terminal or the two-wheeled vehicle. The user's driving safety thus is improved, and the user experience is enhanced.

In order to make the objects, technical solutions, and advantages of the present application more clearly understood, the present application is described below in further detail with reference to specific embodiments and the drawings.

FIG. 1 is a schematic diagram of an application scenario of an audio information transmission system according to an embodiment of the present application.

As shown in FIG. 1, in this example application scenario, the audio information transmission system is provided within a control system 11 of a two-wheeled vehicle 10, and can exchange data with a mobile terminal 20 via a wired or wireless network. The wireless network can be Bluetooth, mobile hotspot, etc. The two-wheeled vehicle 10 communicates with a smart helmet 30 via the audio information transmission system. In addition, both the two-wheeled vehicle 10 and the mobile terminal 20 can exchange data with a cloud server 80 over a mobile communication network. Users can not only directly operate the two-wheeled vehicle 10, but also use the mobile terminal 20 to remotely monitor and control the two-wheeled vehicle 10 to realize various intelligent application functions. In addition, the two-wheeled vehicle 10 is provided with a touch display (not shown in FIG. 1), and users can operate on the display to control the two-wheeled vehicle 10 for corresponding actions.

The mobile terminal 20 can also exchange information with the cloud server 80, and the cloud server 80 can also transmit a control instruction from the mobile terminal 20 to the second control system 11. The second control system 11 can receive the control instruction from the mobile terminal 20, and transmit the control instruction that needs to be processed by a first control system 12 to the first control system 12 for achieving applications in remote control, such as remote locking for anti-theft, etc.

The second control system 11 can also transmit operation state data of the vehicle, including various operation state data of the vehicle, from the first control system to the cloud server 80. It should be noted that the operation state here includes an environmental state of the vehicle, a state of the whole vehicle, a state of each component, a state of the vehicle when driving, and a state of the vehicle in various modes such as shutdown without starting, starting without driving, etc.

The mobile terminal 20 can transmit audio information to the two-wheeled vehicle 10, and the audio information include audio information such as voice messages, telephone calls, music, etc. After receiving the audio information transmitted by the mobile terminal 20, the two-wheeled vehicle 10 first identify a type of the audio information. If the audio information is an instant voice such as telephone call, the audio information is forwarded to the smart helmet 50, and the user answers the telephone call from the mobile terminal 20 via the smart helmet 50. If the audio information is a non-instant voice such as a voice message or music, the audio information is mixed with audio information such as navigation voice and alarm transmitted by an application in the two-wheeled vehicle, and then the mixed audio information is transmitted to the smart helmet 50. The user can listen to music and hear the audio information transmitted by the two-wheeled vehicle simultaneously through the smart helmet 50, and then performs the corresponding operation according to the audio information.

Figure 2:
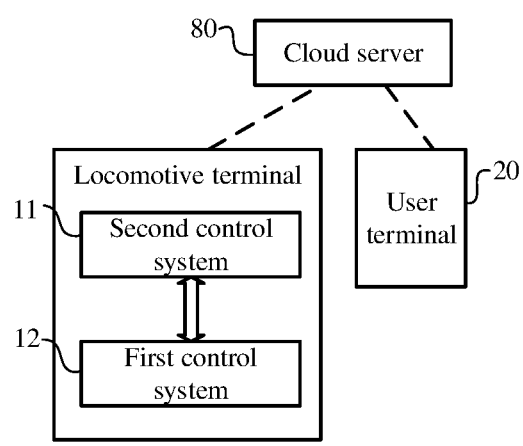
FIG. 2 is a diagram of an overall architecture of a vehicle intelligent control system according to an embodiment of the present application.

FIG. 2 is a diagram of an overall architecture of a vehicle intelligent control system according to an embodiment of the present application. As shown in FIG. 2, the two-wheeled vehicle end includes a first control system 12 and a second control system 11, which constitute a dual independent control system architecture. The dual independent control system architecture means that the first control system 12 and the second control system 11 can operate independently of each other. The independent operation in the present application means that the normal operations of basic operation modes of the first control system 12 do not depend on those of the second control system 11. Specifically, the basic locomotive control of the first control system 12 will not be affected when the second control system 11 is not operating normally, except that the first control system 12 cannot obtain a control instruction from the second control system 11 or transmit the operation state data of the vehicle to the second control system 11 in real time, but the control instruction that cannot be obtained and the state data that cannot be transmitted do not affect the first control system 12 for the basic driving control of the vehicle. In addition, when the second control system 11 is not operating normally, the basic network interconnection of the second control system 11 is not affected, and the second control system 11 cannot obtain the real time operation state of the vehicle from the first control system 12 or transmit additional external control instructions to the first control system 12.

When both the first control system 12 and the second control system 11 are operating normally, the data can be exchanged in real time. In order to realize the function of intelligent application based on remote control, the first control system 12 and the second control system 11 need to exchange data with each other. The first control system 12 may also be referred to as a bottom-layer control system, and its basic functions refer to control functions of the existing vehicle, including real-time monitoring of the operation state of the vehicle and controlling the operation of the vehicle, and receiving a control instruction from the second control system 11 to realize the functions of intelligent applications. The second control system 11, also referred to as a top-layer control system, is mainly used to access a network of connected vehicles for data exchange, and is also used to implement direct information exchange (including controlling the display device to display the vehicle's operation status, information exchange with the smart helmet, etc.) between the locomotive terminal and the user Specifically, the first control system 12 needs to transmit at least part of the operation state data of the vehicle to the second control system 11 in real time, and the first control system 12 can also control the operation of the vehicle according to an internal preset instruction and a control instruction received from the second control system 11. In addition, the second control system 11 receives the data transmitted by the first control system 12 and can transmit at least part of the received data to a cloud server, and the second control system 11 can also receive a control instruction from the cloud server 80 and forward the control instruction therein for controlling the operation of the vehicle to the first control system 12.

The specific data or control instructions to be exchanged between the first control system 12 and the second control system 11, and between the second control system 11 and the cloud server of the present application can be designed differently depending on the specific type, application function, application environment, etc. of the vehicle, but should not be used as a limitation on the present application.

Figure 3:
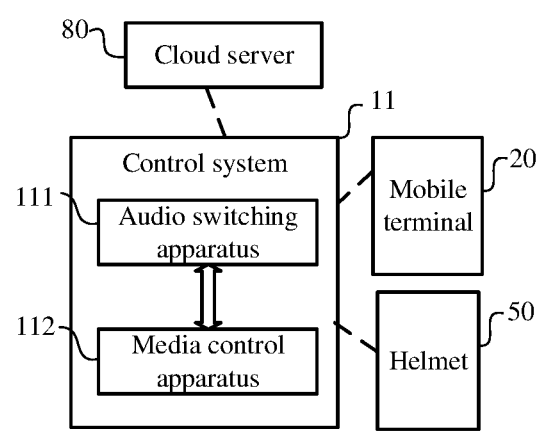
FIG. 3 is a diagram of an overall architecture of an audio information transmission system according to an embodiment of the present application.

FIG. 3 is a diagram of an overall architecture of an audio information transmission system according to an embodiment of the present application.

The two-wheeled vehicle end of the audio information transmission system in the embodiment of the present application is provided within a second control system 11 of the two-wheeled vehicle. The second control system 11 is referred to as the control system 11 for clearer description. As shown in FIG. 3, the control system 11 of the two-wheeled vehicle 10 includes a media control apparatus 112 and an audio switching apparatus 111 connected to the media control apparatus 112. The control system 11 is mainly used to access a network for data exchange, and also to implement direct information exchange (including controlling a display device to display the operation state of the vehicle, information exchange with a smart helmet, etc.) between the two-wheeled vehicle end and the user.

Specifically, the audio switching apparatus 111 is connected to a mobile terminal 20 and a smart helmet 50, to receive first audio information transmitted by the mobile terminal 20 and transmit the first audio information to the media control apparatus 112. The audio switching apparatus 111 is provided with a Bluetooth module that can exchange data with the mobile terminal 20 and the smart helmet 50 wirelessly. The first audio information can be voice messages, telephone calls, music and other audio information. The media control apparatus 112 is configured to receive second audio information generated by the two-wheeled vehicle 10 and the first audio information, and to mix the first audio information with the second audio information to generate mixed audio information. The second audio information can be information such as navigation voices, alarms, etc., and can also be audio information downloaded from a cloud server 80 into the two-wheeled vehicle 10. The media control apparatus 112 transmits the mixed audio information to the smart helmet 50 via the audio switching apparatus 111 for playback to the user.

The audio information transmitted by the mobile terminal is transmitted to the two-wheeled vehicle. The two-wheeled vehicle mixes voice information such as navigation voices, alarms, etc. emitted by itself with the audio information transmitted by the mobile terminal, and transmits the mixed audio information to the helmet, so that the user can obtain both the audio information transmitted by the user terminal and navigation voices transmitted by the electric vehicle, without switching between the audio information from the mobile terminal and the navigation voices emitted by the electric vehicle. The user's driving safety is improved and the user experience is enhanced.

Figure 4:
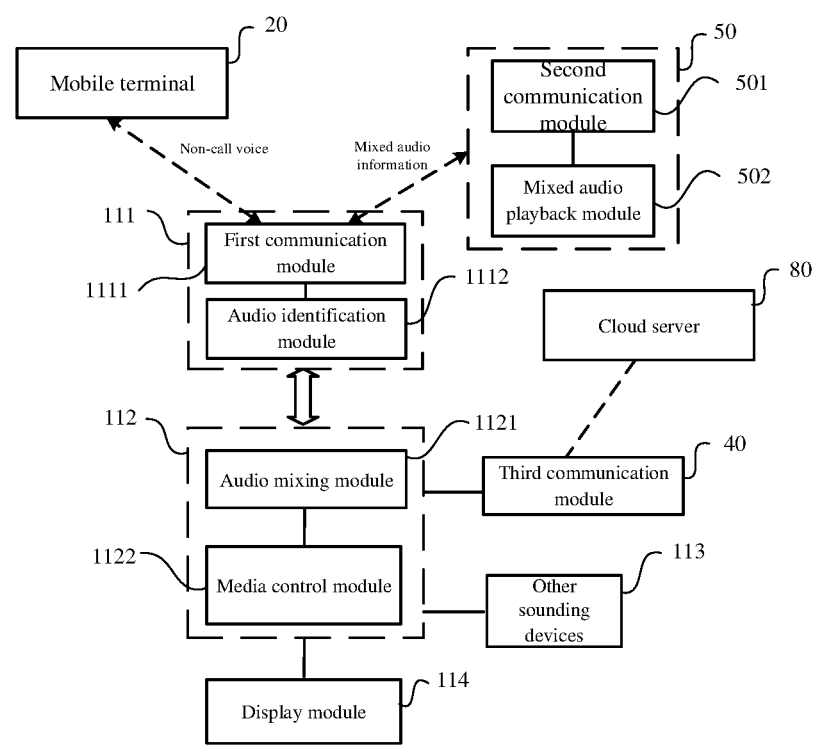
FIG. 4 is a block diagram of a structure of an audio information transmission system according to an embodiment of the present application.

FIG. 4 is a block diagram of a structure of an audio information transmission system according to an embodiment of the present application.

As shown in FIG. 4, in this embodiment, the audio switching apparatus 111 includes a first communication module 1111 and an audio identification module 1112. The media control apparatus 112 includes an audio mixing module 1121 and a media control module 1122. The audio switching apparatus 111 is connected to other sounding devices 113, which may be applications and devices installed on the two-wheeled vehicle 10. The media control module 1122 can be implemented by an electronic control unit (ECU), also known as a "vehicle computer", which includes a microprocessor (CPU), a memory (a ROM and a RAM), an input/output interface (I/O), an analog-to-digital converter (A/D), and a large-scale integrated circuit such as shaping and driving. However, the present application does not exclude other forms of electronic control units, as long as they have certain data storage and processing capabilities.

In addition, the audio switching apparatus 111 is also connected to the cloud server 80 via the third communication module 40, and can upload or download positioning information and audio information from the cloud server 80.

The mobile terminal 20 transmits the audio information to the first communication module 1111. If the audio information is non-instant voice information, the first communication module 1111 transmits the non-instant voice information to the audio identification module 1112 for identification, and carries out different audio mixing processing depending on different audio identification types. If the audio information is instant voice such as telephone calls, the audio identification module 1112 forwards call voice information to the first communication module 1111 and then to the smart helmet 50. The user answers a telephone call from the mobile terminal 20 via the smart helmet 50.

For example, the mobile terminal 20 transmits non-call voice information to the first communication module 1111, and the first communication module 1111 transmits the non-call voice information to the audio identification module 1112 for identification. The non-call voice information is identified as a music or song, it indicates that the user is listening to music with the mobile terminal at this time, then the audio identification module 1112 transmits the music over the first communication module 1111 to the audio mixing module 1121 of the media control apparatus 112. If no audio information is transmitted to the audio mixing module 1121 in the two-wheeled vehicle 10 at this time, the audio mixing module 1121 directly transmits the music to the smart helmet 50 for playback. If the audio mixing module 1121 receives voice navigation information transmitted by a map navigation application in the other sounding devices 113 in the two-wheeled vehicle 10 at this time, it indicates that the user is about to or is driving the two-wheeled vehicle, the media control module 1122 transmits control instructions to the audio mixing module 1121. The audio mixing module 1121 mixes the voice navigation information with music after receiving the control instructions.

The system can preset the priority rules of the audio mixing module 1121, and the priority rules can be set on a display module 114 of the two-wheeled vehicle 10 to set different priorities for different types of audio information. The priority of the telephone call can be set as the highest priority, and priorities of alarm information, voice information, navigation information, entertainment information, etc. can be set from high to low. The entertainment information includes music, movies and other entertainment audio information obtained from the cloud server 80. The priorities can be set according to the user's wishes, which are not limited herein. In addition, the user can also install an application corresponding to the control system 11 of the two-wheeled vehicle 10 in the mobile terminal 20, and sets different priorities for different types of audio information through the application.

The audio mixing parameters can be automatically configured in advance, such as whether to start audio mixing. The audio mixing module 1121 can be set to automatically start audio mixing when receiving audio information to be mixed, and to select the priority rules after starting the audio mixing, for example, when playing the audio information of a high priority, the volume of audio information of a lower priority can be reduced or muted, or can be paused, etc.

The priority rules and audio mixing parameters described above can be set by the user in the user interaction component on the two-wheeled vehicle 10. The user interaction components include keys, buttons, plectrums, etc., set on the two-wheeled vehicle, and a display apparatus for displaying the user interaction interface in real time. The user interaction component can be implemented directly with a touch screen that receives a user input and has a display interface.

In another implementation, both the priority rules and audio mixing parameters described above can be set remotely by the cloud server and the remote client. The mobile terminal 20 or other user terminal with access to the cloud server first retrieves current priority rules and audio mixing parameters of the two-wheeled vehicle via the cloud server and sets them through the user interaction interface of the user terminal. The user terminal converts the user input into configuration instructions and transmits the configuration instructions to the media control apparatus 112 of the two-wheeled vehicle through the cloud server. The priority rules and audio mixing parameters are set by means of remote access.

In addition, the priority rules and audio mixing parameters can be uploaded to the cloud server either by the user's direct operation on the two-wheeled vehicle or by instructions transmitted via the cloud server. In one embodiment, the cloud server can store recommended priority rules and audio mixing parameters, which can be uploaded by other users or can be obtained through big data and machine learning. Thus, the recommended priority rules and audio mixing parameters can be downloaded from the cloud server by the user's direct operation on the two-wheeled vehicle or through configuration instructions transmitted by the cloud server, and then applied on the two-wheeled vehicle.

When there is set the priority of audio information, when the audio information obtained by the audio mixing module 1121 contains audio information of different priorities, the volume of audio information of the lower priority can be reduced or muted at the same time according to the preset priority rules, and the audio information of the lower priority can be paused according to the preset priority rules, which is equivalent to inserting audio information of the higher priority into audio information of the lower priority. Then the audio information is mixed. For example, when the received audio information is voice navigation information transmitted by the other sounding devices 113 of the two-wheeled vehicle 10 and the music transmitted by the mobile terminal 20, the voice navigation information has a higher priority than the music according to the preset priority, thus when the voice navigation information and the music are monitored at the same time, the volume of the music can be reduced or muted until the navigation voice ends and then the volume of the music is restored. Then the processed music is mixed with the voice navigation information to obtain the mixed audio information, which is independent audio information. When the voice navigation information and the music are monitored at the same time, the music can be paused until the navigation voice ends and then the music is restored, which is equivalent to inserting the voice navigation information into the music at the corresponding time to form the mixed audio information. There are various ways to form the mixed audio information, which are not limited herein. When the mixed audio information is formed and transmitted to the helmet for playback, the display module 114 will display an audio mixing status of the mixed audio information. For example, the audio information of a lower priority is paused at a certain time, and the user can check the audio mixing status of the mixed audio information through the display module, to avoid missing important information.

By setting priorities for different types of audio information, multiple types of audio information are mixed in order to form the mixed audio information, without affecting the content and sound quality of the audio information, and multiple types of information are delivered to the user, so that the user does not have to switch between the audio information from the mobile terminal and the navigation voice transmitted by the electric vehicle. The user's driving safety is improved and the user experience is enhanced.

Figure 5:
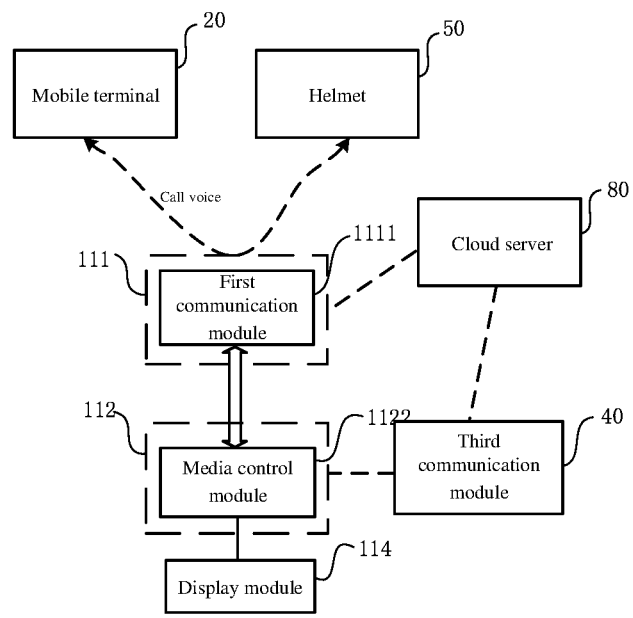
FIG. 5 is a block diagram of a structure of an audio information transmission system according to another embodiment of the present application.

FIG. 5 is a block diagram of a structure of an audio information transmission system according to another embodiment of the present application.

According to the priority setting rules in the above embodiment, when the audio information transmitted by the mobile terminal 20 to the first communication module 1111 is an instant call voice such as a telephone call, this type of audio information has the highest priority, and there is no need to transmit the telephone call to the audio mixing module 1121 for audio mixing, but need to directly forward the telephone call to the smart helmet 50 through the first communication module, and the information of the telephone call is transmitted to the media control apparatus 112. The media control apparatus 112 is connected to a touch display module 114. The display module 114 displays the same interface as that displayed by a screen of the mobile terminal. The telephone information includes the caller's phone number. If there are remarks in the mobile terminal, the remarks name, the place of belonging and other information will be displayed, and the user can operate, such as answer, hang up, on the touch display module 114. After choosing to answer, the user can talk to the caller on the mobile terminal 20 through the smart helmet 50. After receiving the telephone information, the media control apparatus 112 will stop transmitting the mixed audio information to the smart helmet 50 to ensure that the call is not interfered with and to improve the call quality.

An embodiment of the present application further provides a two-wheeled vehicle, as shown in FIG. 1. The two-wheeled vehicle 10 includes a vehicle body and an audio information transmission system provided in the vehicle body. The mobile terminal transmits audio information to the two-wheeled vehicle 10. The audio information transmission system in the two-wheeled vehicle 10 mixes the voice information such as navigation voices and alarms emitted by the two-wheeled vehicle 10 itself and the driving information transmitted by the cloud server with the audio information transmitted by the mobile terminal to form the mixed audio information, and then the mixed audio information is transmitted to the helmet for playback. The mixed audio information is different depending on the degree of degree of each type of audio information. When driving, the user can obtain, via the headset from the mixed audio information, both the audio information transmitted by the user terminal and the navigation information transmitted by the electric vehicle, without operating the user terminal or the two-wheeled vehicle. The user's driving safety thus is improved and the user experience is enhanced. The structure and function of the audio information transmission system in this embodiment are the same as or similar to the audio information transmission system described in the above embodiment, and will not be repeated herein.

Figure 6:
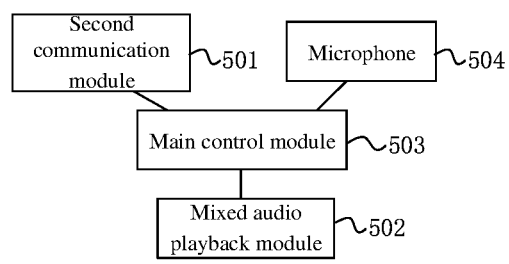
FIG. 6 is a block diagram of a modular structure of a communication device of a helmet according to an embodiment of the present application.

FIG. 6 is a block diagram of a modular structure of a communication apparatus of a helmet according to an embodiment of the present application.

The helmet in this embodiment can be a smart helmet, and the overall structure is as shown in the smart helmet 50 in FIG. 1. The smart helmet includes a shell and a communication device provided inside the shell. As shown in FIG. 6, the communication device includes: a main control module 503, a second communication module 501 and a headset. The headset includes a microphone 504 and a headset mixed audio playback module 502. The second communication module 501 can be a Bluetooth module, wirelessly connected to the two-wheeled vehicle, for receiving the mixed audio information transmitted by the two-wheeled vehicle and forwarding the mixed audio information by the main control module 503 to the mixed audio playback module 502 of the headset for playback. The mixed audio information is generated by the two-wheeled vehicle mixing the first audio information transmitted by the mobile terminal with the second audio information generated by the two-wheeled vehicle itself. The microphone 504 of the headset is used for user calls. If the two-wheeled vehicle transmits to the helmet is not the mixed audio information but the instant call information such as a telephone call, the main control module 503 will control and turn on the microphone 504 of the headset and the mixed audio playback module 502 simultaneously, and answers the call through the second communication module 501.

The priority rules can be preset during audio mixing, and the priority rules can be set on the display of the two-wheeled vehicle 10 to set different priorities for different types of audio information. An application corresponding to the control system 11 of the two-wheeled vehicle 10 can also be installed in the mobile terminal, and the user sets different priorities for different types of audio information through the application. When the audio information obtained by the two-wheeled vehicle 10 contains audio information of different priorities, the volume of audio information of the lower priority can be reduced or muted at the same time according to the preset priority rules, and the audio information of the lower priority can be paused according to the preset priority rules, which is equivalent to inserting audio information of the higher priority into audio information of the lower priority. Then the audio information is mixed. The mixed audio information obtained is transmitted to the headset of the helmet for playback.

It should be noted that the smart helmet described in this embodiment is an example implementation of the present application, and any helmet that can communicate with the two-wheeled vehicle and display or play information can be applied to the present application. In other words, each function module of the above-mentioned smart helmet can be added or deleted according to different purposes.

The interaction between the two-wheeled vehicle and the smart helmet makes the functions of the audio information transmission system of the present application more diversified and convenient, improves the user's feeling of intelligence and remote control even more, enhances the user experience, and improves the quality of people's lives.

Figure 7:
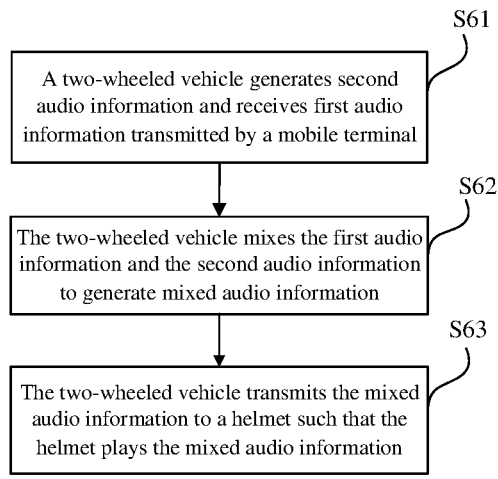
FIG. 7 is a flowchart of an audio information transmission method according to an embodiment of the present application.

FIG. 7 is a flowchart of an audio information transmission method according to an embodiment of the present application.

As shown in FIG. 7, the method includes the following steps.

S61: A two-wheeled vehicle generates second audio information and receives first audio information transmitted by a mobile terminal.

In one embodiment, the first audio information transmitted by the mobile terminal can be audio information such as music, voice messages, telephone calls, etc., and the second audio information generated by the two-wheeled vehicle can be information such as navigation voices, alarms, etc., and can also be audio information downloaded from the cloud server into the two-wheeled vehicle, and the two-wheeled vehicle stores both types of audio information received.

S62: The two-wheeled vehicle mixes the first audio information with the second audio information to generate mixed audio information.

In one embodiment, the priority rules can be preset, and the priority rules can be set on the display of the two-wheeled vehicle to set different priorities for different types of audio information. The priority of a telephone call can be set as the highest priority, and priorities of alarm information, voice information, navigation information, entertainment information, etc. can be set from high to low. The entertainment information includes music, movies and other entertainment audio information obtained from the cloud server. The priorities can be set according to the user's wishes, which are not limited herein. In addition, the user can also install an application corresponding to the control system of the two-wheeled vehicle in the mobile terminal, and sets different priorities for different types of audio information through the application.

The mobile terminal transmits the first audio information to the two-wheeled vehicle. When the audio information is non-instant voice information and the two-wheeled vehicle also obtains the second audio information emitted by itself, the two types of audio information at this time correspond to different priorities. The volume of audio information of a lower priority can be reduced or muted at the same time according to the preset priority rules, and the audio information of the lower priority can be paused according to the preset priority rules. For example, when the received audio information is voice navigation information transmitted by the two-wheeled vehicle and the music transmitted by the mobile terminal, the voice navigation information has a higher priority than the music according to the preset priority. When the voice navigation information and the music are monitored at the same time, the volume of the music can be reduced or muted until the navigation voice ends and then the music is restored, and then the processed music is mixed with the voice navigation information to obtain the mixed audio information, which is independent audio information. When the voice navigation information and the music are monitored at the same time, the music can be paused until the navigation voice ends and then the music is restored, which is equivalent to inserting the voice navigation information into the music at the corresponding time to form the mixed audio information. There are various ways to form the mixed audio information, which are not limited herein.

S63: The two-wheeled vehicle transmits the mixed audio information to the helmet for playback.

In one embodiment, the mobile terminal transmits the audio information to the two-wheeled vehicle. If the audio information is non-instant voice information, the two-wheeled vehicle identifies the non-instant voice information, performs different audio mixing processing depending on different audio identification types, and transmits the mixed audio information to the smart helmet for playback. If the audio information is an instant call voice such as a telephone call, the two-wheeled vehicle forwards the call voice information to the smart helmet, and the user answers a call from the mobile terminal via the smart helmet.

By setting priorities for different types of audio information, multiple types of audio information are mixed in order to form the mixed audio information without affecting the content and sound quality of the audio information, and multiple types of information are transmitted to the user, so that the user does not switch between the audio information from the mobile terminal and the navigation voice transmitted by the electric vehicle. The user's driving safety is improved and the user experience is enhanced.

Figure 8:
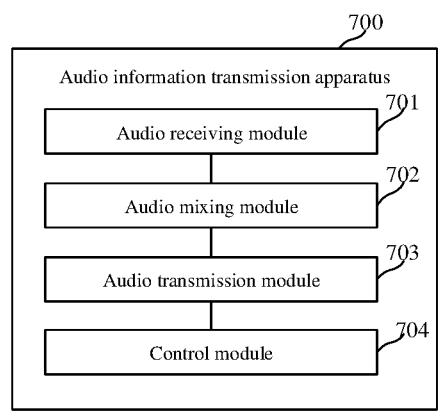
FIG. 8 is a schematic diagram of an audio information transmission apparatus according to an embodiment of the present application.

FIG. 8 is a schematic diagram of an audio information transmission apparatus according to an embodiment of the present application.

As shown in FIG. 8, the apparatus 700 is used for transmitting audio information among the two-wheeled vehicle, the mobile terminal, and the helmet, and includes an audio receiving module 701, an audio mixing module 702, an audio transmission module 703, and a control module 704.

The audio receiving module 701 is configured to receive second audio information generated by the two-wheeled vehicle and first audio information transmitted by the mobile terminal. Specifically, the first audio information transmitted by the mobile terminal can be audio information such as music, voice messages, telephone calls, etc., and the second audio information generated by the two-wheeled vehicle can be information such as navigation voices, alarms, etc., and can also be audio information downloaded from the cloud server into the two-wheeled vehicle, and the two-wheeled vehicle stores both types of audio information received.

The audio mixing module 702 is configured to mix the first audio information with the second audio information to generate mixed audio information.

Specifically, priority rules can be preset during audio mixing, and the priority rules can be set on the display of the two-wheeled vehicle to set different priorities for different types of audio information. The priority of telephone calls can be set as the highest priority, and priorities of alarm information, voice information, navigation information, entertainment information, etc. can be set from high to low. The entertainment information includes music, movies and other entertainment audio information obtained from the cloud server. The priorities can be set according to the user's wishes, which are not limited herein. In addition, the user can also install an application corresponding to the control system of the two-wheeled vehicle in the mobile terminal, and sets different priorities for different types of audio information through the application.

The mobile terminal transmits the first audio information to the two-wheeled vehicle. When the audio information is non-instant voice information and the two-wheeled vehicle also obtains the second audio information emitted by itself, the two types of audio information at this time correspond to different priorities. The volume of audio information of the lower priority can be reduced or muted at the same time according to the preset priority rules, and the audio information of the lower priority can be paused according to the preset priority rules. For example, when the received audio information is voice navigation information transmitted by the two-wheeled vehicle and the music transmitted by the mobile terminal, the voice navigation information has a higher priority than the music according to the preset priority. When the voice navigation information and the music are monitored at the same time, the volume of the music can be reduced or muted until the navigation voice ends and then the music is restored, and then the processed music is mixed with the voice navigation information to obtain the mixed audio information, which is independent audio information. When the voice navigation information and the music are monitored at the same time, the music can be paused until the navigation voice ends and then the music is restored, which is equivalent to inserting the voice navigation information into the music at the corresponding time to form the mixed audio information. There are various ways to form the mixed audio information, which are not limited herein.

The audio transmission module 703 is configured to transmit the mixed audio information to the helmet.

Specifically, the mobile terminal transmits the audio information to the two-wheeled vehicle. If the audio information is non-instant voice information, the two-wheeled vehicle identifies the non-instant voice information, performs different audio mixing processing depending on different audio identification types, and transmits the mixed audio information to the smart helmet for playback. If the audio information is an instant call voice such as a telephone call, the two-wheeled vehicle forwards the call voice information to the smart helmet, and the user answers a call from the mobile terminal via the smart helmet.

By setting priorities for different types of audio information, multiple types of audio information are mixed in order to form the mixed audio information without affecting the content and sound quality of the audio information, and multiple types of information are transmitted to the user, so that the user does not switch between the audio information from the mobile terminal and the navigation voice transmitted by the electric vehicle. The user's driving safety is improved and the user experience is enhanced.

The control module 704 is configured to control the helmet to play the mixed audio information.

Specifically, the control module 704 controls the audio transmitting module 703 to transmit the mixed audio information to the helmet for playback, and the mixed audio information is different depending on the degree of importance of each type of audio information. The user can obtain, via the headset when driving, both the audio information transmitted by the user terminal and information such as the navigation voice transmitted by the electric vehicle, without operating the user terminal or the two-wheeled vehicle. The user's driving safety is improved and the user experience is enhanced.

Figure 9:
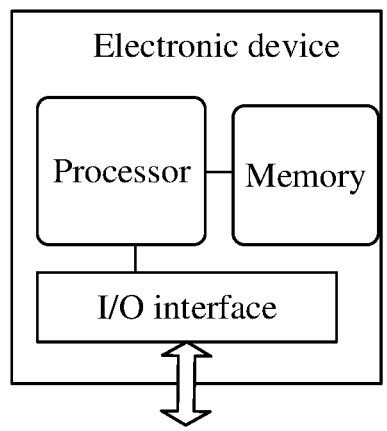
FIG. 9 is a schematic diagram of a structure of an electronic device according to an embodiment of the present application.

FIG. 9 is a schematic diagram of a structure of an electronic device according to an embodiment of the present application. The electronic device includes a memory storing a computer executable program and a processor, and the processor executes an audio information transmission method when the computer program is executed by the processor.

The electronic device is represented by a general-purpose computing device as shown in FIG. 9. The processor may be one or more working in cooperation. The present application also does not exclude performing distributed processing, i.e., the processors may be distributed among different physical devices. The electronic device of the present application is not limited to a single entity, but can also be the sum of multiple physical devices.

The memory stores a computer-executable program, usually machine-readable code. The computer-readable program may be executed by the processor to enable the electronic device to perform the method or at least some of the steps in the method of the present application.

The memory includes volatile memory, such as random access memory units (RAM) and/or cache memory units, and may also be non-volatile memory, such as read-only memory units (ROM).

Optionally, the electronic device in this embodiment further includes an I/O interface for exchanging data between the electronic device and external devices. the I/O interface may be one or more of several types of bus structures, including a memory cell bus or memory cell controller, a peripheral bus, a graphics acceleration port, a processing unit, or a local bus using any of the multiple bus structures.

It should be understood that the electronic device shown in FIG. 9 is only an example of the present application, and that the electronic devices of the present application may also include elements or components not shown in the above examples. For example, some electronic devices also include display units such as displays, and some electronic devices also include human-computer interaction elements such as push buttons, keyboards, etc. As long as the electronic device is capable of executing a computer-readable program in memory to implement methods and at least some of the steps of the method of the present application, it may be considered an electronic device covered by the present application.

By the above description of the embodiment, it is readily understood by those skilled in the art that the present application can be implemented by hardware capable of executing a particular computer program, such as the system of the present application, and the electronic processing unit, server, client, cell phone, control unit, processor, etc. contained in the system, and that the present application can also be implemented by a vehicle containing at least part of the above system or components. The present application can also be realized by computer software executing the method of the present application, such as control software executed by a microprocessor, an electronic control unit, a client, a server, etc. at the locomotive terminal. However, it should be noted that the computer software for executing the method of the present application is not limited to being executed by one or a specific hardware entity, but can also be implemented by non-specific hardware in a distributed manner, for example, some steps of the method of the computer program can be executed on the locomotive terminal and another part can be executed in a mobile terminal or a smart helmet, etc. For computer software, the software product can be stored in a computer-readable storage medium (which can be a CD-ROM, a USB stick, a mobile hard disk, etc.) or can be stored in a distributed manner on a network, as long as it enables the electronic device to execute the method according to the present application.

Figure 10:
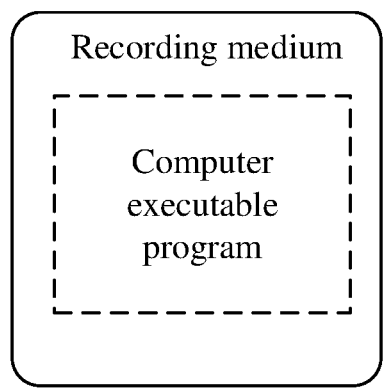
FIG. 10 is a schematic diagram of a computer-readable recording medium according to an embodiment of the present application.

FIG. 10 is a schematic diagram of a computer-readable recording medium provided in one embodiment of the present application. As shown in FIG. 10, a computer-readable recording medium stores a computer-executable program, and the computer-executable program, when executed, implements the audio information transmission method described above in the present application. The computer-readable storage medium may include a data signal propagated in the base band or as part of a carrier wave carrying the readable program code. Such propagated data signals may take a variety of forms, including but not limited to electromagnetic signals, optical signals, or any suitable combination of the foregoing. The readable storage medium may also be any readable medium other than a readable storage medium that sends, propagates, or transmits a program for use by or in conjunction with an instruction execution systems, devices, or components. The program code contained on the readable storage medium may be transmitted by using any suitable medium, including but not limited to wireless, wired, optical, RF, etc., or any suitable combination of the foregoing.

The program code for performing the operations of the present application may be written in any combination of one or more programming languages. The programming languages include object-oriented programming languages—such as Java, C++, etc., and also include conventional procedural programming languages—such as "C" language or similar programming languages. The program code may be executed entirely on the user computing device, partially on the user device, as a stand-alone package, partially on the user computing device and partially on the remote computing device, or entirely on the remote computing device or server. In a case of involving a remote computing device, the remote computing device may be connected to the user computing device via any kind of network, including a local area network (LAN) or a wide area network (WAN), or, may be connected to an external computing device (e.g., using an Internet service provider to connect via the Internet).

The specific embodiments described above provide a further detailed description of the purpose, technical solutions and beneficial effects of the present application. It should be understood that the above description is only a specific embodiment of the present application and is not intended to limit the present application, and any modifications, equivalent replacements, improvements, etc. made within the spirit and principles of the present application shall be included in the claimed scope of the present application.

What is claimed is:

1. An audio information transmission system, for transmitting audio information among a two-wheeled vehicle, a mobile terminal and a helmet, wherein the system comprises a media control apparatus and an audio switching apparatus both provided in the two-wheeled vehicle, the audio switching apparatus being connected to the media control apparatus, wherein
the audio switching apparatus establishes a data connection to each of the mobile terminal and the helmet, to receive first audio information transmitted by the mobile terminal and forward the first audio information to the media control apparatus;
the media control apparatus is configured to receive the first audio information and second audio information generated by the two-wheeled vehicle, and mix the first audio information with the second audio information to generate mixed audio information;
the audio switching apparatus is further configured to transmit the mixed audio information to the helmet; and
the audio switching apparatus further comprises an audio identification module for identifying a type of the first audio information received, wherein
the audio switching apparatus forwards the first audio information to the helmet when the first audio information is a call voice, and forwards the first audio information to the media control apparatus when the first audio information is a non-call voice.

2. The system according to claim 1, wherein
the audio switching apparatus comprises a first communication module for receiving the first audio information transmitted by the mobile terminal and forwarding the first audio information to the media control apparatus; and
the media control apparatus comprises a media control module and an audio mixing module, wherein
the media control module is configured to forward the first audio information to the audio mixing module and transmit control instructions to the audio mixing module; and
the audio mixing module is configured to receive the control instructions, and mix the first audio information with the second audio information to generate the mixed audio information.

3. The system according to claim 2, wherein the media control module is further configured to obtain priority information of the first audio information and the second audio information, or set different priorities for the first audio information and the second audio information depending on types of the audio information; and
control the audio mixing module to mix the first audio information with the second audio information according to the priority information to generate the mixed audio information.

4. The system according to claim 3, wherein the audio mixing module reduces or mutes volume of audio information of a lower priority when mixing audio information of different priorities.

5. The system according to claim 3, wherein the audio mixing module pauses audio information of a lower priority when mixing audio information of different priorities.

6. The system according to claim 1, further comprising:
a second communication module and a mixed audio playback module provided in the helmet, wherein the second communication module is configured to receive the mixed audio information, and the mixed audio playback module is configured to play the mixed audio information.

7. The system according to claim 1, further comprising:
a cloud server and a third communication module connected to the media control apparatus, wherein the cloud server exchanges information with the media control apparatus via the third communication module.

8. The system according to claim 7, wherein the media control apparatus receives configuration instructions transmitted by the cloud server, wherein the configuration instructions are used for generating priority rules and/or audio mixing parameters of the mixed audio information.

9. The system according to claim 1, further comprising:
a display module provided in the two-wheeled vehicle and connected to the media control apparatus, wherein the media control apparatus is configured to transmit audio mixing status information to the display module for a visual display.

* * * * *